US010221945B2

(12) United States Patent
Hoshino et al.

(10) Patent No.: US 10,221,945 B2
(45) Date of Patent: Mar. 5, 2019

(54) ELECTRONIC CONTROL DEVICE FOR VEHICULAR AUTOMATIC TRANSMISSION

(71) Applicant: HITACHI AUTOMOTIVE SYSTEMS, LTD., Hitachinaka-shi, Ibaraki (JP)

(72) Inventors: Kenichi Hoshino, Hitachinaka (JP); Ryosuke Ishida, Hitachinaka (JP); Hideki Sekiguchi, Hitachinaka (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 56 days.

(21) Appl. No.: 15/545,938

(22) PCT Filed: Jan. 12, 2016

(86) PCT No.: PCT/JP2016/050606
§ 371 (c)(1),
(2) Date: Jul. 24, 2017

(87) PCT Pub. No.: WO2016/121474
PCT Pub. Date: Aug. 4, 2016

(65) Prior Publication Data
US 2018/0003296 A1 Jan. 4, 2018

(30) Foreign Application Priority Data
Jan. 26, 2015 (JP) .................. 2015-012660

(51) Int. Cl.
*F16H 61/12* (2010.01)
*F16H 61/04* (2006.01)

(52) U.S. Cl.
CPC ......... *F16H 61/12* (2013.01); *F16H 61/0437* (2013.01); *F16H 2061/1228* (2013.01);
(Continued)

(58) Field of Classification Search
CPC ..... F16H 2061/1268; F16H 2061/1232; F16H 2061/1244
See application file for complete search history.

(56) References Cited

U.S. PATENT DOCUMENTS 5,094,115 A * 3/1992 Michihira .............. B60K 37/06
475/7
5,370,015 A * 12/1994 Moscatelli ............. B60K 37/06
324/207.2

FOREIGN PATENT DOCUMENTS

| JP | H11-073203 A | 3/1999 |
| JP | 2009-274569 A | 11/2009 |
| JP | 2012-073748 A | 4/2012 |

OTHER PUBLICATIONS

International Search Report dated May 17, 2016 as received in corresponding International Application No. PCT/JP2016/050606.
(Continued)

*Primary Examiner* — Tisha D Lewis
(74) *Attorney, Agent, or Firm* — Foley & Lardner LLP

(57) ABSTRACT

The present invention addresses the problem of obtaining an electronic control device for a vehicular automatic transmission that suppresses sudden acceleration, sudden deceleration, and gear shift shock that occur when the transmission moves into a fail-safe mode due to the electronic control device stopping during a main CPU abnormality. An electronic control device 100 for a vehicular automatic transmission has: a main CPU 3 that performs gear shift control for the vehicular automatic transmission; and a sub-CPU 4 that detects abnormalities in the main CPU 3. When the sub-CPU 4 detects an abnormality in the main CPU 3 while the vehicle is traveling, the sub-CPU 4 stops the gear shift control executed by the main CPU 3.

9 Claims, 10 Drawing Sheets

(52) U.S. Cl.
CPC ............... *F16H 2061/1232* (2013.01); *F16H 2061/1244* (2013.01); *F16H 2061/1268* (2013.01)

(56) References Cited

OTHER PUBLICATIONS

Written Opinion of the International Search Authority dated May 17, 2016 as received in corresponding International Application No. PCT/JP2016/050606.
Database WPI, Week 200863, Thomson Scientific, London, GB, AN 2008-K50123, XP002784696.
Extended European Search Report dated Oct. 10, 2018 in European Patent Application No. 16743078.4.

* cited by examiner

FIG. 2

| STEADY STATE | DURING GEAR SHIFT | CLUTCH OR BRAKE TO BE ENGAGED | BRAKE 1 | CLUTCH 1 | BRAKE 2 | CLUTCH 2 |
|---|---|---|---|---|---|---|
| · HIGHER 4 BITS: BITS INSTRUCTING TO MAINTAIN GEAR POSITION<br>· LOWER 4 BITS: BITS CORRESPONDING TO SOL1 TO SOL4 AND INSTRUCTING CURRENT CONTROL | · HIGHER 4 BITS: BITS INSTRUCTING CURRENT SOL CONTROL<br>· LOWER 4 BITS: BITS INSTRUCTING SOL CONTROL AFTER GEAR SHIFT | CORRESPONDING SOLENOID (KIND) / GEAR POSITION | SOL1 (N/C) | SOL2 (N/O) | SOL3 (N/C) | SOL4 (N/O) |
| FIRST: F9 (1111 1001) | FIRST→SECOND: 93 (1001 0011)<br>SECOND→FIRST: 39 (0011 1001) | FIRST | ○ ↕ | | ↕ | ○ |
| SECOND: F3 (1111 0011) | SECOND→THIRD: 30 (0011 0000)<br>THIRD→SECOND: 03 (0000 0011) | SECOND | | | ○ ↕ | ○ |
| THIRD: F0 (1111 0000) | THIRD→FOURTH: 06 (0000 0110)<br>FOURTH→THIRD: 60 (0110 0000) | THIRD | | ○ ↕ | ↕ | |
| FOURTH: F6 (1111 0110) | | FOURTH | | | ○ | |

○ : SOLENOID REQUIRING CURRENT CONTROL
N/C : NORMAL CLOSE SOLENOID (CLOSE AT CURRENT VALUE OF 0A)
N/O : NORMAL OPEN SOLENOID (OPEN AT CURRENT VALUE OF 0A)

RELEASE ↑  ↓ ENGAGE

FIG. 10

| BIT INFORMATION TRANSMITTED DURING GEAR SHIFT<br>· HIGHER 4 BITS: INSTRUCT CURRENT SOL CONTROL<br>· LOWER 4 BITS: INSTRUCT SOL CONTROL AFTER GEAR SHIFT | EXEMPLARY COMBINATIONS OF CONTROL CHANGES WITHOUT DOUBLE MESH OF GEAR (TOTAL GEAR SHIFT TIME IS ASSUMED AT 200msec) | | | |
|---|---|---|---|---|
| | BRAKE 1<br>SOL1<br>(N/C) | CLUTCH 1<br>SOL2<br>(N/O) | BRAKE 2<br>SOL3<br>(N/C) | CLUTCH 2<br>SOL4<br>(N/O) |
| ON GEAR SHIFT FROM FIRST TO SECOND 93 (1001 0011) | RELEASED SOL: -10mA/1msec UNTIL 0A | | ENGAGED SOL: 5mA/1msec UNTIL 1A | |
| ON GEAR SHIFT FROM SECOND TO FIRST 39 (0011 1001) | ENGAGED SOL: 5mA/1msec UNTIL 1A | | RELEASED SOL: -10mA/1msec UNTIL 0A | |
| ON GEAR SHIFT FROM SECOND TO THIRD 30 (0011 0000) | | | RELEASED SOL: -10mA/1msec UNTIL 0A | ENGAGED SOL: -5mA/1msec UNTIL 1A |
| ON GEAR SHIFT FROM THIRD TO SECOND 03 (0000 0011) | | | ENGAGED SOL: 5mA/1msec UNTIL 1A | RELEASED SOL: 10mA/1msec UNTIL 0A |
| ON GEAR SHIFT FROM THIRD TO FOURTH 06 (0000 0110) | | RELEASED SOL: 10mA/1msec UNTIL 0A | ENGAGED SOL: 5mA/1msec UNTIL 1A | |
| ON GEAR SHIFT FROM FOURTH TO THIRD 60 (0110 0000) | | ENGAGED SOL: -5mA/1msec UNTIL 1A | RELEASED SOL: -10mA/1msec UNTIL 0A | |

ELECTRONIC CONTROL DEVICE FOR VEHICULAR AUTOMATIC TRANSMISSION

TECHNICAL FIELD

The present invention relates to an electronic control device for vehicular automatic transmission including a main microcomputer (denoted as main CPU below) and a sub-microcomputer (denoted as sub-CPU below) in a mutual surveillance relationship with the main CPU.

BACKGROUND ART

When an abnormality occurs in a vehicle, the engine or transmission transits to a limp home mode or transits to a mechanical fail-safe mode such as fixed gear position, and thus the vehicle can travel for a certain time. For example, an electronic control device for controlling the vehicle is programmed to control the vehicle at a fixed water temperature of 80° C. when a water temperature sensor breaks down. Further, an electronic control device for transmission gear shift control has a fail-safe mechanism for settling at a specific gear position when an abnormality occurs. For example, a 5-speed automatic transmission (denoted as AT below) has a mechanism in which the gear is fixed at fourth during abnormal stop of an electronic control device or at third during abnormal power supply voltage, but the fail-safe mode is different depending on a kind of the transmission.

In the electronic control device, a plurality of items of parameter information for determining a traveling state of the vehicle are input in the main CPU, and the main CPU monitors the traveling state of the vehicle on the basis of the parameter information, which is reflected on actuator control. For example, a solenoid is a transmission actuator, but the main CPU controls a current flowing in the solenoid while monitoring a vehicle speed or accelerator position, thereby performing gear shift control on the basis of the gear shift diagram of FIG. 1, and monitors a change in engine revolutions or a hydraulic pressure, thereby performing smooth gear shift.

Here, if the gear is fixed at third in the fail-safe mode in a transmission when an abnormality occurs in the main CPU, shift-up or shift-down to third is forcibly performed in all the traveling states other than third. At this time, even if the gear enters third at the start of traveling at first, the driver only feels poor acceleration, and the vehicle cannot suddenly accelerate or suddenly decelerate. However, if the gear is shifted to third while the vehicle is traveling downhill at second, the vehicle can accelerate though the driver does not intend. Therefore, a tilt state of the vehicle needs to be determined and the vehicle needs to be controlled to keep traveling downhill at second.

Further, in FIG. 1, if an abnormality occurs in the main CPU in a high-speed traveling state of fourth, vehicle speed of 80 km/h, and accelerator position of ⅛, the gear is forcibly shifted to third and sudden deceleration can occur due to the engine braking. Further, if a traveling state is of high accelerator position and so high engine revolutions, the gear is similarly shifted to third, which can cause sudden acceleration, or engine overload due to excessive revolutions. Thus, in any case, the traveling is kept at fourth, or the shift-down control from fourth to third needs to be performed while monitoring the vehicle speed or engine revolutions and determining a timing when it reaches a certain value or less.

However, the sub-CPU is low in arithmetic capability than the main CPU in the conventional electronic control device using the sub-CPU for monitoring the main CPU, and thus only simple control can be performed such as including an arithmetic result sent from the main CPU with a given value thereby to detect an abnormality in the main CPU and to reset the main CPU. Thus, even if the sub-CPU detects an abnormality in the main CPU, it cannot perform the arithmetic processing instead of the main CPU, the main CPU is reset by the sub-CPU, the electronic control of the actuator is stopped and the actuator transits to the operations in the fail-safe mode.

In this way, in the conventional electronic control device, when an abnormality is detected in the main CPU irrespective of a traveling state such as the vehicle is accelerating, decelerating, or traveling downhill, the sub-CPU resets the main CPU soon. While the actuator is transiting from the operation under control of the main CPU to the operation in the fail-safe mode, the smooth gear shift control, which has been performed so far on the basis of the hydraulic control or timing control by the electronic control device, is not performed, and thus the gear shift is forcibly performed with a rapid gear shift shock to the driver and a mechanical load can be imposed on the transmission.

Since higher control safety has been requested for the electronic control device in recent years, a sophisticated sub-CPU or multicore CPU having the equivalent performance to the main CPU is used thereby to temporarily do complicated arithmetic and perform actuator control of the main CPU even when abnormality occurs in the main CPU. For example, some control parameters (such as vehicle speed or engine revolutions) required for the arithmetic are previously monitored by the sub-CPU and the main CPU is reset when the main CPU is abnormal, while the arithmetic and actuator control are performed and the operations of the electronic control device can be continued until the main CPU recovers after being reset. Alternatively, the multicore CPU can similarly continue the operations by previously doing arithmetic in parallel even when an abnormality occurs in one core.

Japanese Patent Application Laid-Open No. 11-73203 (PTL 1) is one of background art in the field of the present technique. PTL 1 describes that "the sub-microcomputer continues to give a reset signal to the reset terminal of the main microcomputer when detecting an abnormality in the main microcomputer, and switches the I/O port to the output port thereby to output a drive signal to the drive circuit" (see Abstract). Further, Japanese Patent Application Laid-Open No. 2012-73748 (PTL 2) describes that "the first core performs the processing performed by the second core as the first alternative processing at lower loads than the second core performs, and the second core performs the processing performed by the first core as the second alternative processing at lower loads than the first core performs" in the multicore CPU.

CITATION LIST

Patent Literature

PTL 1: Japanese Patent Application Laid-Open No. 11-73203

PTL 2: Japanese Patent Application Laid-Open No. 2012-73748

SUMMARY OF INVENTION

Technical Problem

As described in PTL 1 and PTL 2, a sophisticated sub-CPU or multicore CPU is used until the main CPU recovers from the reset when the main CPU is abnormal, thereby doing alternative arithmetic and performing alternative control of the main CPU. However, no literature describes the control when the main CPU does not normally recover, and employs the conventional system in which the system stops the electronic control device irrespective of a traveling state of the vehicle and transits to the fail-safe mode, such as "the electronic control device is stopped when the main CPU does not normally recover after (a plurality of) resets.

The present invention has been made in terms of the problems, and it is an object thereof to provide an electronic control device capable of restricting sudden braking of a vehicle by performing a soft landing operation to compensate for a difference by a sub-CPU even when a main CPU does not recover from an abnormality and stops the electronic control device in terms of the difference between a vehicle traveling state when the abnormality occurs in the main CPU in the electronic control device and a vehicle traveling state in a fail-safe mode after the electronic control device stops.

Solution to Problem

The present invention employs the configurations described in CLAIMS, for example, in order to solve the above problems. The present invention includes a plurality of solutions for solving the above problems, and an example thereof is an electronic control device for vehicular automatic transmission having a fail-safe mechanism that fixes a preset gear position due to abnormal stop of electronic control, the electronic control device including: a main CPU that performs gearshift control of the vehicular automatic transmission; and a sub-CPU that detects an abnormality in the main CPU, wherein the sub-CPU obtains information on whether a control state of the vehicular automatic transmission is while a gear position is being maintained or while a gear position is being changed from the main CPU, when detecting an abnormality in the main CPU while the vehicle is traveling, performs alternative control of stopping gear shift control by the main CPU, causing the vehicular automatic transmission to perform a gear position maintaining operation of continuing to maintain a gear position while the gear position is being maintained, and causing the vehicular automatic transmission to perform a gear shift auxiliary operation of continuing the gear position shift operation and maintaining a shifted gear position while the gear position is being changed instead of the main CPU, and terminates the alternative control when the vehicle stops traveling, and abnormally stops electronic control of the vehicular automatic transmission.

Advantageous Effects of Invention

According to the present invention, it is possible to restrict sudden acceleration, sudden deceleration, and gear shift shock which occur when the transmission transits to a fail-safe mode, which can occur when the electronic control device stops during an abnormality in the main CPU.

BRIEF DESCRIPTION OF DRAWINGS

FIG. 2 illustrates bit information indicating a gear position in a steady state (normal traveling state) and a gear being shifted, as well as combinations of solenoids for gear shift, and control current values by way of example.

FIG. 10 illustrates exemplary current value changes in the absence of double mesh of gears according to the second embodiment.

DESCRIPTION OF EMBODIMENTS

Figure 1:
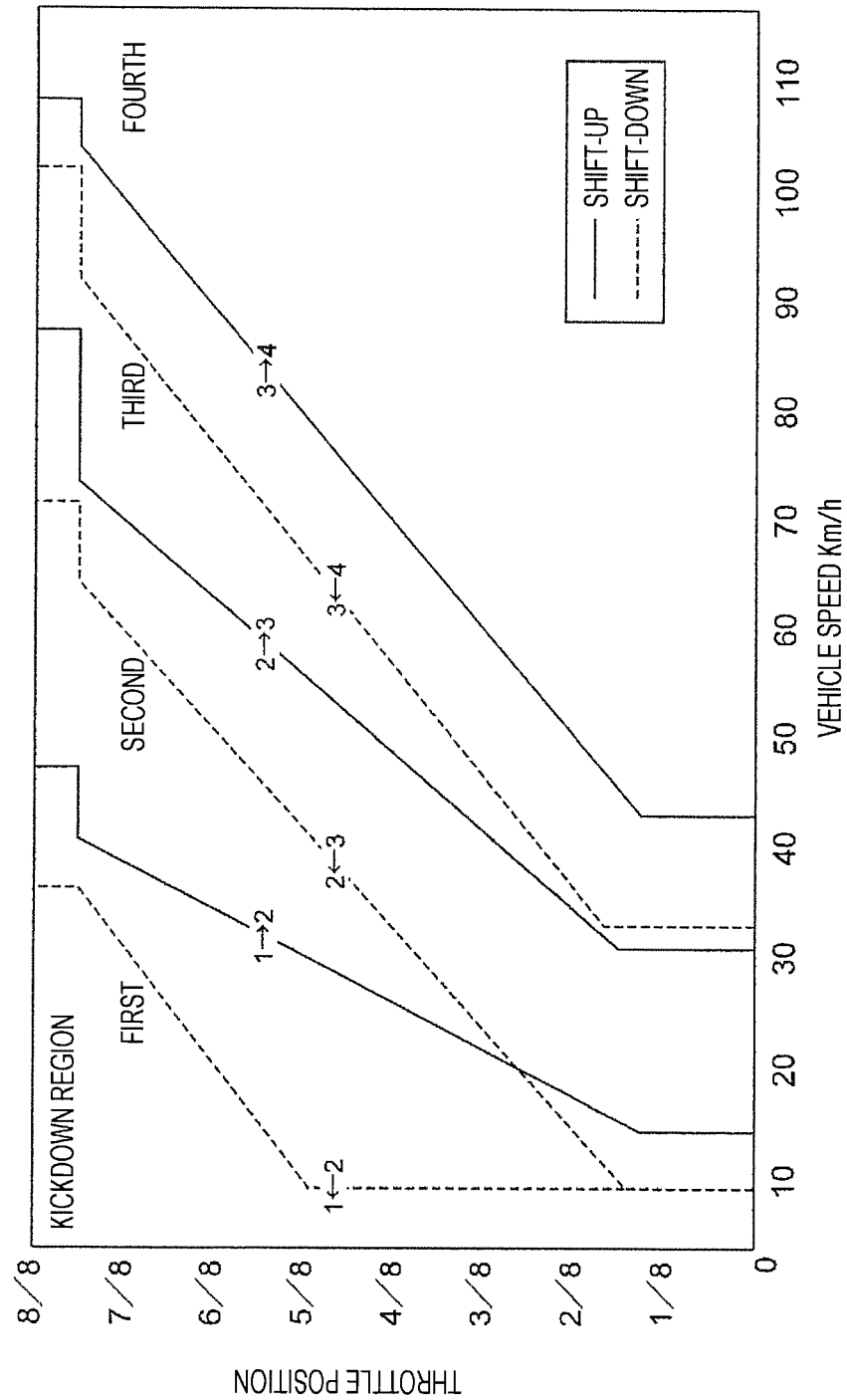
FIG. 1 is a gear shift diagram of a typical transmission.

Embodiments of the present invention will be described below with reference to the drawings. Additionally, the present invention is not limited to the following embodiments, and can employ various forms within the technical scope of the present invention.

First Embodiment

An exemplary electronic control device for vehicular automatic transmission for performing a soft landing operation will be described according to the first embodiment. An electronic control device according to the first embodiment is directed for electronically controlling a vehicular automatic transmission. The soft landing operation in the specification is, mainly when an abnormality occurs in the electronic control device for vehicular automatic transmission, to notify a driver of the abnormality in the electronic control device while the vehicle is traveling thereby to promote him/her to decelerate or stop the vehicle, to perform temporary auxiliary control for restricting a gear shift shock which occurs along with a rapid variation in hydraulic pressure due to the absence of current control to an electromagnetic valve (denoted as solenoid below) required for performing smooth hydraulic control during gear shift in the transmission, and to top the auxiliary control and to put the transmission into the fail-safe mode when a vehicle traveling state such as vehicle traveling stop, or stop of the vehicle, is under a certain condition, thereby alleviating mechanical loads on the transmission and shocks on the driver.

The behaviors of the vehicle on transition to the fail-safe mode varies depending on a traveling state of the vehicle, and the soft landing operation is to control the actuator depending on a change in traveling state of the vehicle via the transition, but a sophisticated sub-CPU, which can do arithmetic instead of a main CPU, is required to perform the soft landing operation in all the traveling states. However, the use of the sophisticated sub-CPU leads to higher cost of the electronic control device, and a solution to realize simplicity and higher safety is required by use of an inexpensive sub-CPU.

In the electronic control device according to the first embodiment, when the sub-CPU detects an operational abnormality in the main CPU, the sub-CPU controls for the soft landing operation until the actuator transits to the fail-safe mode to stably operate.

Conventionally, the sub-CPU used for monitoring the main CPU is lower in arithmetic capability and smaller in ROM capacity than the main CPU, and thus the sub-CPU cannot determine a traveling state of the vehicle or maintain the actuator control information in all the traveling states. Thus, the first embodiment uses a method for previously patterning the traveling states and holding the actuator control information depending on the patterns in the ROM incorporated in the sub-CPU. Specifically, the numbers (bit information), which are determined on the basis of a gear position or vehicle speed indicating a traveling state of the vehicle while the main CPU is normal, are transmitted as information on the control states for the vehicle automatic transmission to the sub-CPU, and the sub-CPU takes out and uses the actuator control information from the ROM on the basis of the numbers (bit information) thereby to perform the soft landing operation while the main CPU is abnormal.

There has been already described, in the gear shift diagram in FIG. 1, that the gear is forcibly shifted in transiting to the fail-safe mode while the vehicle is traveling at a gear position other than the gear position fixed in the fail-safe mode (fixed at third in the application), and thus the vehicle can suddenly accelerate or suddenly decelerate, and further a gear shift shock or the like can occur to the driver. However, the sub-CPU used for monitoring the main CPU can perform all gear shift control with difficult while the main CPU is stopping. Thus, the control of maintaining a current gear position is employed as one specific example of the soft landing operation. The actuator control information for maintaining a current gear position, such as information on combinations of solenoid drive signals at each gear position, may be taken in the ROM incorporated in the sub-CPU. The information on combinations of solenoid drive signals at each gear position is different per transmission.

FIG. 2 illustrates that the bit information at each gear position is assigned to a combination of clutch and brake to be released and engaged in association with the solenoid operation in a 4-speed AT. The bit information is always transmitted from the main CPU to the sub-CPU, and indicates two patterns of while the vehicle is normally traveling, or a steady state, and while the gear is being shifted. In the steady state, the higher four bits instruct to maintain a gear position and the lower four bits correspond to the solenoid drive instructions corresponding to SOL1 to SOL4 (current control of SOL1 to SOL4 is performed at 1001, for example), and during gear shift, the higher four bits indicate current SOL control instructions, and the lower four bits indicate SOL control instructions after gear shift. In the application, the higher four bits do not indicate a gear position corresponding to 1111 (current control is performed on all of SOL1 to SOL4) even during gear shift, and thus are used as a flag for identifying that the vehicle is in the steady state. Further, in the transmission according to the present embodiment, the gear position is controlled to be fixed at third by the fail-safe mechanism of the transmission on transition to the fail-safe mode, and thus the combination for the third gear is obtained in the absence of the current control of SOL1 to SOL4 in FIG. 2, but a gear position to be fixed or a current value required for maintaining the hydraulic pressure is different per transmission.

The main CPU transmits the gear position information in a current vehicle traveling state to the sub-CPU on the basis of the bit information in FIG. 2 when being normal, and the sub-CPU takes out a drive signal to each solenoid for controlling the hydraulic pressure required for maintaining a current gear position from the incorporated ROM and transmits it to an actuator control circuit depending on the bit information received and obtained immediately before when an abnormality occurs in the main CPU. In this way, the sub-CPU maintains a gear position as the first soft landing operation, (gear position maintaining operation) so that the gear is not forcibly shifted in the fail-safe mode and the vehicle can continue to travel for a certain time even when an abnormality occurs in the main CPU in the electronic control device and then does not normally recover.

Gear shift in a transmission is typically to engage (reapply) the clutch or the brake in a gear connected after gear shift while releasing the clutch or the brake in another gear connected before gearshift, thereby changing a gear ratio. A combination of hydraulic pressure and solenoid required for engaging and releasing the clutch or the brake is different depending on a transmission, and a relationship between current value and hydraulic pressure is different depending on a solenoid. Further, the hydraulic pressure of the clutch may be controlled by a plurality of solenoids, or a solenoid may be used (N/C: normal close) such that as the current value decreases, the hydraulic pressure increases. The clutch and the brake are engaged and released by controlling each hydraulic pressure and a current flowing in the solenoid by use of the electronic control device. That is, the electronic control device controls a current flowing in the solenoid for gear shift with high accuracy, thereby performing smooth gear shift without a gear shift shock.

Figure 3:
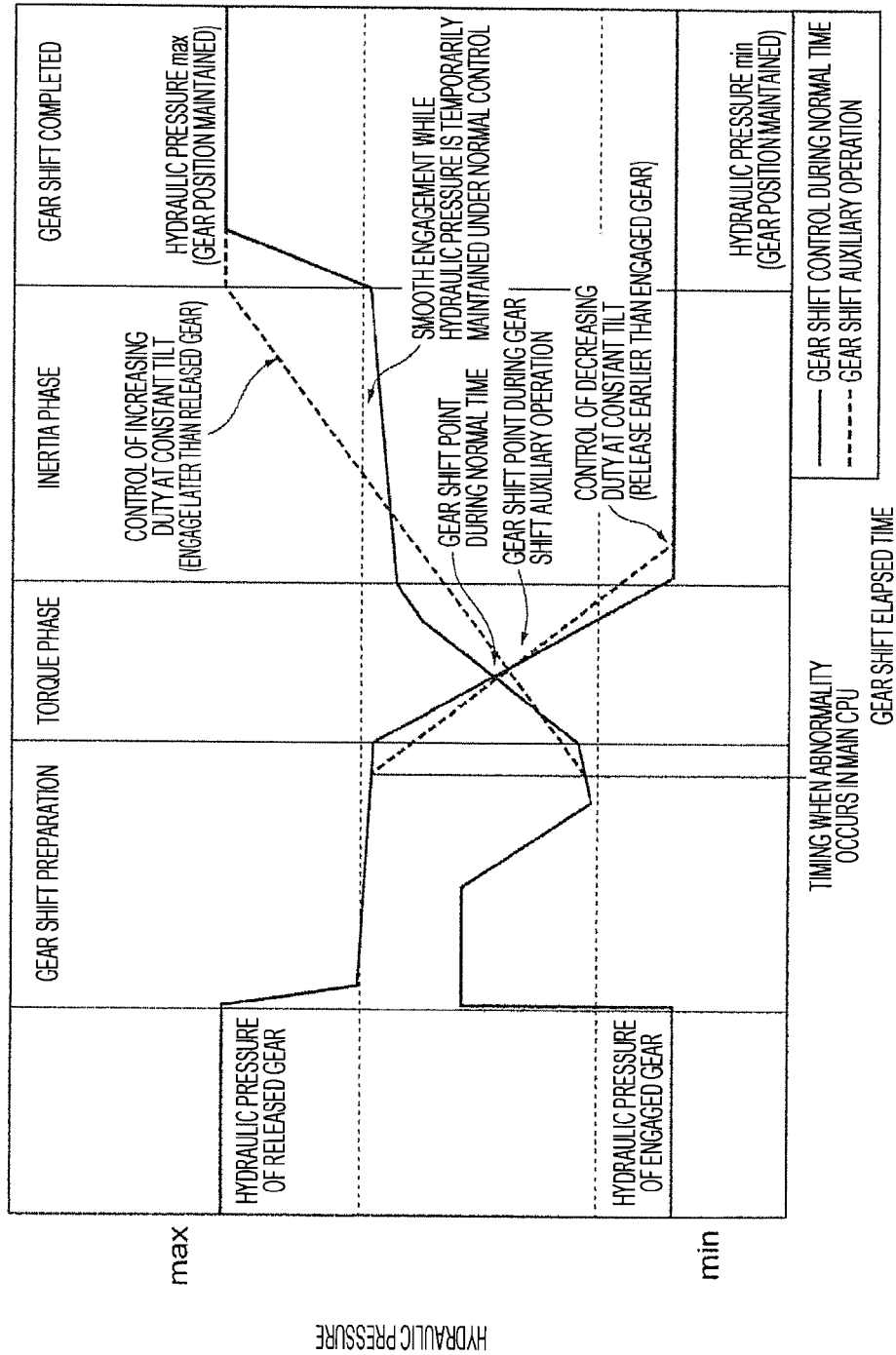
FIG. 3 is an exemplary graph of gear shift phase (gear shift elapsed time) and hydraulic control.

FIG. 3 illustrates a graph of hydraulic pressure over time in phases of gear shift. When an abnormality occurs in the main CPU, hydraulic control is eliminated due to the stop of the electronic control device, and the hydraulic pressure of the engaged gear can increase (in the engaged state) before the hydraulic pressure of the released gear lowers to a certain value (before the released state). At this time, when the gears are temporarily in a double mesh state, a gear shift hock is larger, and a large mechanical load can be imposed on the transmission. In this way, if an abnormality occurs in the main CPU during gear shift control, a gear shift auxiliary operation of continuing gear shift control needs to be performed without maintaining a current gear position in order to avoid an unintentionally-excessive load at a gear shift timing. Thus, an auxiliary operation for gear shift control is assumed as a specific example of the second soft landing operation (gear shift auxiliary operation).

Gear shift is determined per transmission as to shift-up or shift-down from what speed to what speed, and whether one engaged gear is for the clutch (or brake) and the other engaged gear is for the clutch (or brake). Thus, combinations of solenoids for which the hydraulic pressure has to be controlled (or current control is required) are also determined per transmission. Therefore, if the actuator control of gradually increasing the hydraulic pressure of the engaged gear while gradually decreasing the hydraulic pressure of the released gear so that the hydraulic pressure of the engaged gear reaches max after the hydraulic pressure of the released gear reaches min is previously stored in the ROM in the sub-CPU as in the auxiliary gear shift (broken line) in FIG. 3, auxiliary gear shift can be performed without double mesh of the gears.

Figure 4:
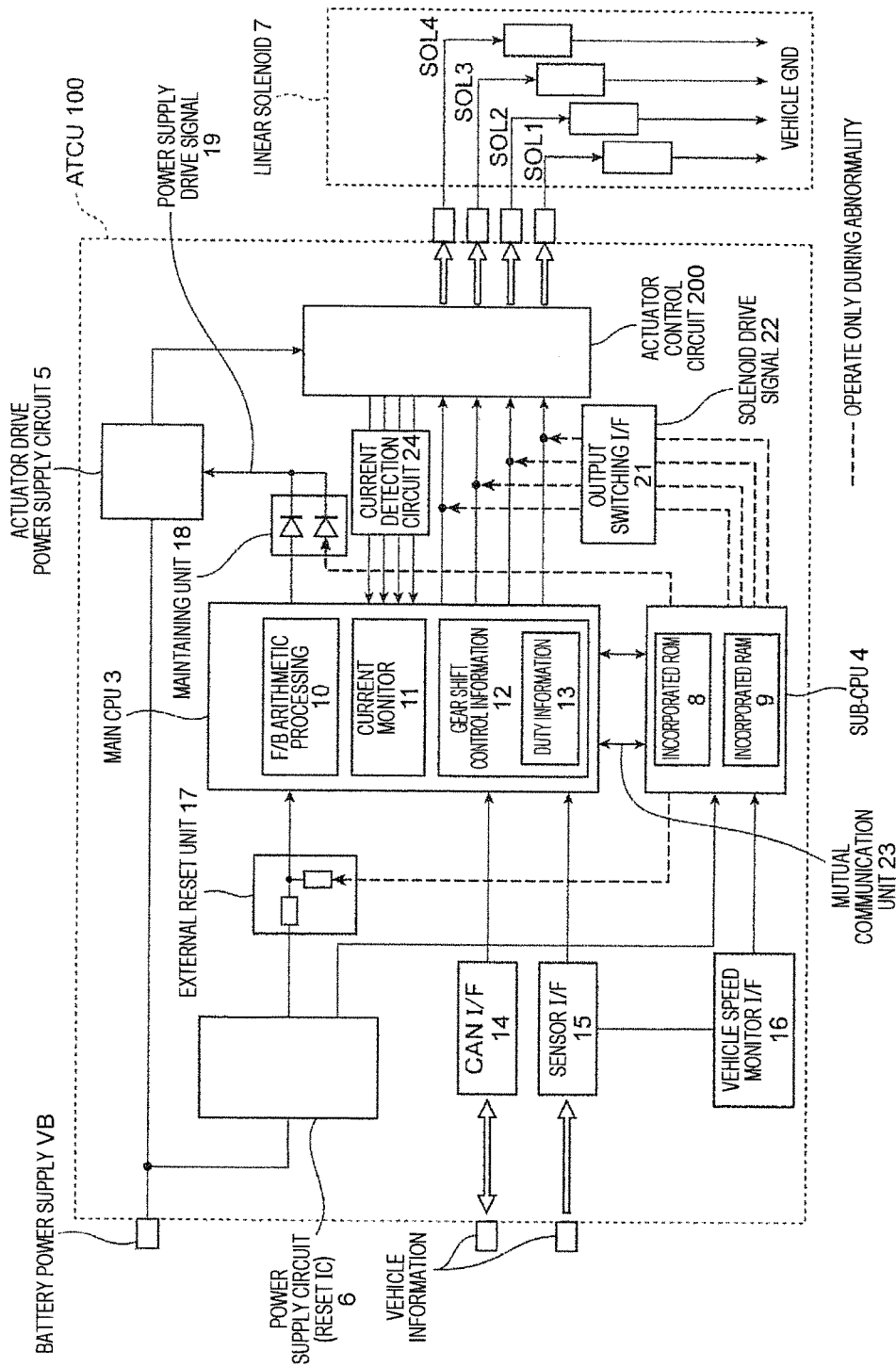
FIG. 4 is a configuration diagram of an electronic control device according to a first embodiment.

FIG. 4 illustrates a block diagram of a typical electronic control device for transmission. An electronic control device for transmission (ATCU) 100 includes a main CPU 3 and a sub-CPU 4. The main CPU 3 obtains various sensor entries for vehicle control, or traveling parameter information (such as vehicle speed, engine revolutions, and throttle position) from an electronic control device for engine (ECU) via CAN communication (CAN I/F 14) or sensor input (sensor I/F 15), and determines a gear shift timing on the basis of the information thereby to control actuator power (mainly drive current of a linear solenoid 7). Further, the main CPU 3 can stop the power of an actuator control circuit 200 by stopping a power supply drive signal 19 of an actuator drive power supply circuit 5 when detecting an abnormality in the power of the actuator.

The sub-CPU 4 monitors a P-RUN signal from the main CPU 3, and further monitors the arithmetic results by a mutual communication unit 23 such as UART (asynchronous serial communication) or SPI (synchronous serial communication). When the sub-CPU 4 detects an abnormality in the main CPU 3, it resets the main CPU 3 by forcibly setting the reset terminal of the main CPU 3 at Low via an external reset unit 17 irrespective of reset power (High power in this case) of a power supply circuit (reset IC) 6 activating the main CPU 3. At this time, the actuator drive power supply circuit 5 stops when the main CPU 3 stops, and thus the actuator drive power supply circuit 5 maintains the power supply drive signal 19 by a maintaining unit 18 in the OR configuration of power from the main CPU 3 and power from the sub-CPU 4, and does not stop the power of the actuator control circuit 200.

The actuator control circuit 200 operates on the basis of gear shift control information 12 from the main CPU 3 while the main CPU 3 is normal, and the main CPU 3 obtains a current flowing in the linear solenoid 7 by a current detection circuit 24 (which may be incorporated in the actuator control circuit 200) via a current monitor 11 and performs a F/B arithmetic processing 10 thereby to independently control a drive current of each linear solenoid required for shifting and maintaining the gear of the transmission.

Generally, timing control is performed for changing a gear position by engaging or releasing the clutch or the brake in the transmission so that the current in the linear solenoid 7 is controlled with high accuracy thereby to smoothly change the hydraulic pressure in the transmission and to prevent a rapid gear shift shock from occurring. However, the power of the actuator control circuit 200 is stopped in transition to the fail-safe mode, and thus the hydraulic pressure rapidly varies and a gear shift shock can accordingly occur.

Thus, the sub-CPU 4 performs the control of maintaining a current gear position even when an abnormality occurs in the main CPU 3 as the soft landing operation in order to prevent a gear shift shock from occurring. Combinations of clutch and brake to be engaged and released at each gear position are determined per transmission, and combination information of solenoid drive signals 22 for maintaining each gear position is previously held in a ROM 8 incorporated in the sub-CPU 4 thereby to address the situation. Further, the main CPU 3 holds the information on a current gear position, and thus the sub-CPU 4 receives the bit information corresponding to a gear position previously illustrated in FIG. 2, as the gear shift control information 12, via a mutual communication unit 23 and stores it in a RAM 9 incorporated in the sub-CPU 4 until just before the main CPU 3 is abnormal, and can take it out as needed.

The hydraulic pressure can be controlled by a value of the current flowing in the linear solenoid 7, and the current value is controlled by changing the DUTY value included in the solenoid drive signal 22 (mainly PWM signal). However, the resistance value of the solenoid itself varies depending on the oil temperature in the transmission or the temperature property of the solenoid, and the same current value is not necessarily obtained at the same DUTY value. Thus, DUTY information 13 is required together with the combinations of solenoid drive signals 22 for maintaining a current gear position.

The main CPU 3 does feedback arithmetic (the F/B arithmetic processing 10) such that a target current value is obtained during normal time, and arithmetically calculates the DUTY value per solenoid corresponding to the target current required for controlling the hydraulic pressure on gear shift. The main CPU 3 previously transmits the DUTY information 13 included in the gear shift control information 12 to the sub-CPU 4 via the mutual communication unit 23, and the sub-CPU 4 stores the DUTY information 13 in the incorporated RAM 9.

The control information (the solenoid drive signal 22) for outputting a PWM waveform when the main CPU 3 is abnormal is included in the ROM 8 incorporated in the sub-CPU 4, and the sub-CPU 4 transmits a combination of the solenoid drive signal 22 and the DUTY information 13 taken out from the incorporated RAM 9 to the actuator control circuit 200 via an output switching I/F 21 when the main CPU 3 is abnormal, thereby maintaining a current traveling gear position as the soft landing operation without stopping the drive current of the linear solenoid 7 even when an abnormality occurs in the main CPU 3.

The soft landing operation is to continue the control of maintaining a current gear position until the main CPU 3 recovers from the reset or until a vehicle speed monitor I/F 16 determines to stop the vehicle even when the main CPU does not normally recover after a certain number of resets. The vehicle stops, and the sub-CPU 4 stops the power of the power supply drive signal 19, stops the actuator drive power supply 5, and terminates the operation as the electronic control device. Thereafter, the transmission transits to the fail-safe mode and is fixed at third as the fail-safe mode according to the present embodiment, thereby avoiding a gear shift shock or the like from occurring while traveling.

Figure 5:
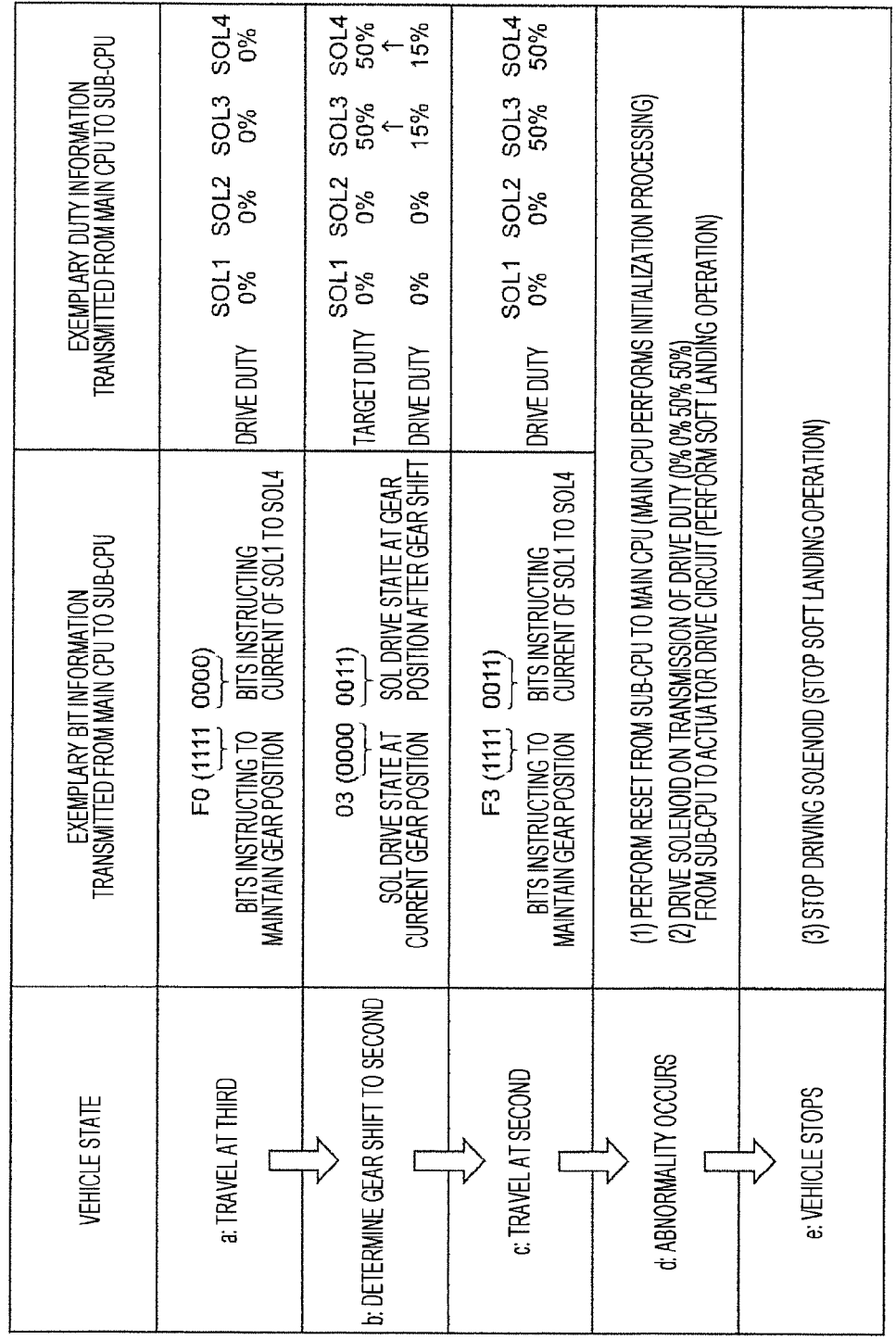
FIG. 5 illustrates exemplary control when an abnormality occurs in a main CPU in a steady state after gear shift.

FIG. 5 illustrates the bit information transmitted from the main CPU to the sub-CPU and the DUTY information for the traveling states of the vehicle on the basis of the bit information in FIG. 2 by way of example. The DUTY information includes drive DUTY and target DUTY, where the drive DUTY is DUTY that the main CPU actually controls the solenoid and the target DUTY is DUTY set by the main CPU during gear shift in order to maintain the solenoid current value after the completion of gear shift. The bit information of F0 (1111 0000) indicating traveling at third and the drive DUTY are transmitted from the main CPU to the sub-CPU at the state of a, and 1111 which are the bits instructing to maintain a current gear position and 0000 which are the bits indicating the currents of SOL1 to SOL4 are transmitted as described above in FIG. 2. Here, in the case of traveling at third, the current control of SOL1 to SOL4 is not required, and thus the drive DUTY is all 0%.

The bit information of 03 (0000 0011) is transmitted from the main CPU to the sub-CPU at the state of b, but 1111 instructing to maintain a gear position is not found therein, which indicates during gear shift. At this time, the main CPU transmits the target DUTY and the drive DUTY together to the sub-CPU. The main CPU controls the drive DUTY to approach the target DUTY, and then the gear shift is completed.

When the gear shift to second is completed and the vehicle enters the state of c, the main CPU transmits the bit information of F3(1111 0011) to the sub-CPU, and transmits the drive DUTY (0% 0% 50% 50% in the example) together. At this time, assuming that an abnormality occurs in the main CPU, the vehicle enters the state of d. 1111, which is the higher four bits in the bit information at the time of c, is the bits indicating that the gear position is being maintained, and thus the sub-CPU does not need to perform the gear shift auxiliary operation, and resets the main CPU and performs the current control on SOL3 and SOL4 on the basis of 0011 as the lower four bits in the bit information and the drive DUTY thereby to perform the soft landing operation.

Figure 6:
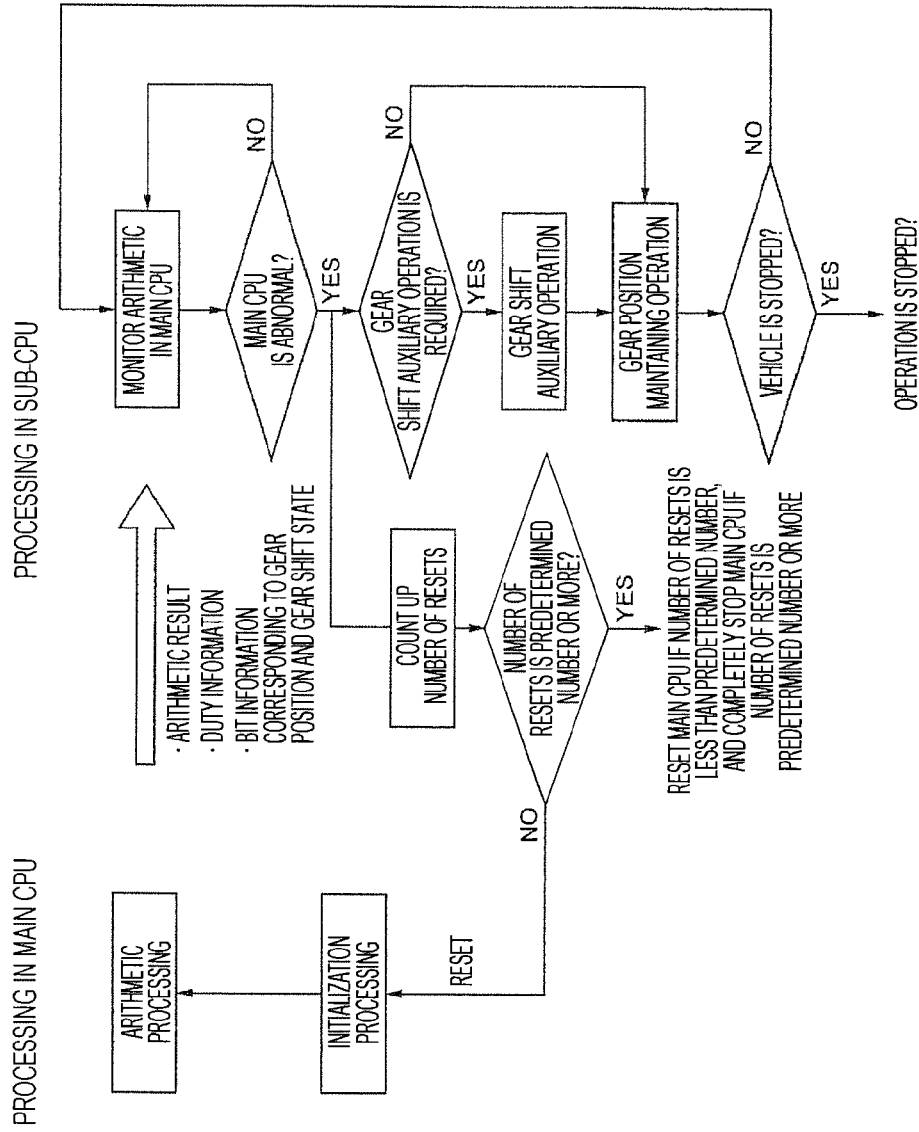
FIG. 6 illustrates a control loop of the main CPU and a sub-CPU.

FIG. 6 illustrates a loop of control of the main CPU and control of the sub-CPU. The sub-CPU always monitors the arithmetic of the main CPU, and continues to reset the main CPU until the number of resets due to an abnormality reaches the predetermined number and continues a loop of initialization and arithmetic monitoring of the reset main CPU when the abnormality occurs in the arithmetic result in the main CPU. When the main CPU does not normally recover and the number of resets reaches the predetermined number, the main CPU is completely stopped without recovery from the reset main CPU. Meanwhile, the sub-CPU determines whether to perform the gear shift auxiliary operation on the basis of the bit information corresponding to a gear position and a gear shift situation previously transmitted from the main CPU, and performs the gear shift auxiliary operation and the gear position maintaining operation as alternative control thereby to perform the soft landing operation. The gear shift auxiliary operation and the gear position maintaining operation by the sub-CPU are terminated when the vehicle stops traveling. When the vehicle stops traveling, the electronic control device stops due to an abnormality, and switches to the fail-safe mode by the fail-safe mechanism in the transmission. Additionally, when the main CPU normally recovers, the gear shift auxiliary operation and the gear position maintaining operation by the sub-CPU are terminated and the gear shift control is restarted by the main CPU.

There will be subsequently described a method for performing the soft landing operation when an abnormality occurs in the main CPU during gear shift in the electronic control device using the configuration of FIG. 4 like when an abnormality occurs in the main CPU as illustrated in FIG. 3.

Figure 7:
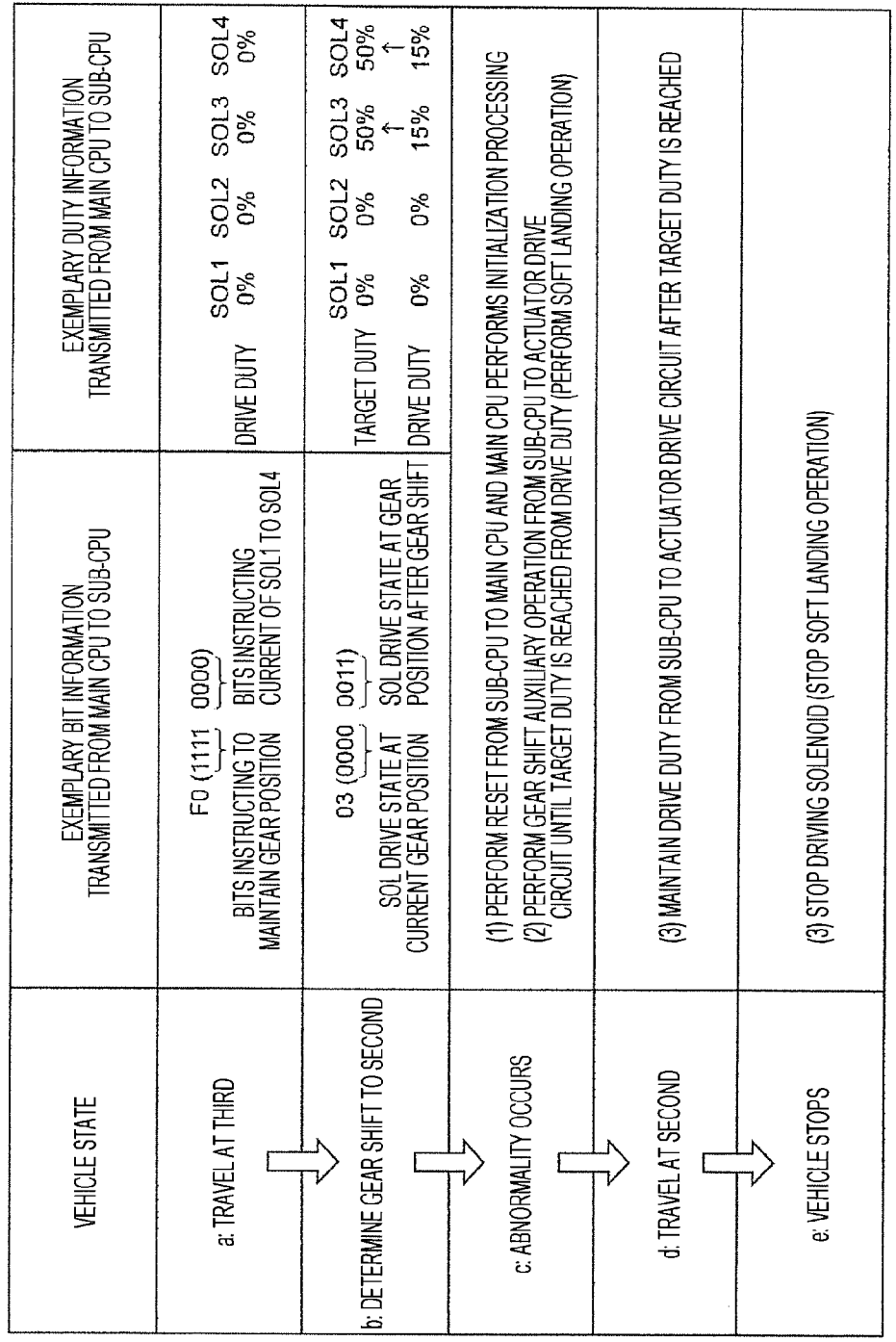
FIG. 7 illustrates an example when an abnormality occurs in the main CPU during gear shift in FIG. 5.

FIG. 7 illustrates a flow when an abnormality occurs in the main CPU while the vehicle is shifting the gear from third to second. The bit information and the drive DUTY information corresponding to a gear position are transmitted to the sub-CPU when gear shift is completed at the time of normal control a similarly as in FIG. 5. Then, the bit information transmitted from the main CPU is 03(0000 0011) and 1111 as the bits instructing to maintain a gear position is not found therein in the state of b during gear shift, and thus it is determined that the sub-CPU needs to perform the gear shift auxiliary operation.

When performing the gear shift auxiliary operation, the sub-CPU uses the target DUTY and the drive DUTY transmitted until just before an abnormality occurs in the main CPU. During gear shift from third to second, SOL3 and SOL4, which are the solenoids with bits of 1, are controlled on the basis of the higher four bits 0000 and the lower four bits 0011 until the drive DUTY reaches the target DUTY, thereby performing the gear shift auxiliary operation. Here, SOL4 which controls the clutch 2 of the released gear needs to be closer to the control DUTY value earlier than SOL3 which controls the brake 2 of the engaged gear in order to avoid double mesh of the gears, and thus the data on the amount of change at which double mesh does not occur is previously held in the control ROM in the sub-CPU thereby to cope with the situation. For example, while a gear position is being changed, the clutch or brake of the gear connected before the gear position is changed is released at a constant release speed, and the clutch or brake of the gear connected after the gear position is changed is engaged at a constant engagement speed lower than the release speed. According to the present embodiment, the drive DUTY of the solenoid of the released gear is increased by 2% while the drive DUTY of the solenoid of the engaged gear is increased by 1%, and the release speed is set to be double as high as the engagement speed.

In this way, when an abnormality occurs in the main CPU during the gear shift operation, a drive signal with the amount of change is transmitted to the solenoids for controlling the hydraulic pressure of the released gear and the hydraulic pressure of the engaged gear on the basis of the bit information, and thus the auxiliary gear shift is enabled. Further, after the gear shift auxiliary operation is completed, the drive DUTY is maintained on the basis of d in FIG. 7 until the vehicle temporarily stops, thereby performing the soft landing operation at a maintained gear position.

The gear position information and the bit information on gear shift states, which are determined when the main CPU 3 is normal, are used according to the first embodiment, but the gear shift is performed by so slower control in msec than the processing time of the CPU, and thus sufficiently reliable control can be performed even by use of the bit information immediately before the sub-CPU 4 detects an abnormality in the main CPU 3.

According to the first embodiment of the ATCU 100 in FIG. 4 using the above configuration and the control operation, the control until the transmission transits to the fail-safe mode, or the soft landing operation can be performed at low cost even when the main CPU 4 is abnormal even by use of the sub-CPU 4 which is lower in arithmetic capability than the main CPU 3.

Second Embodiment

Figure 8:
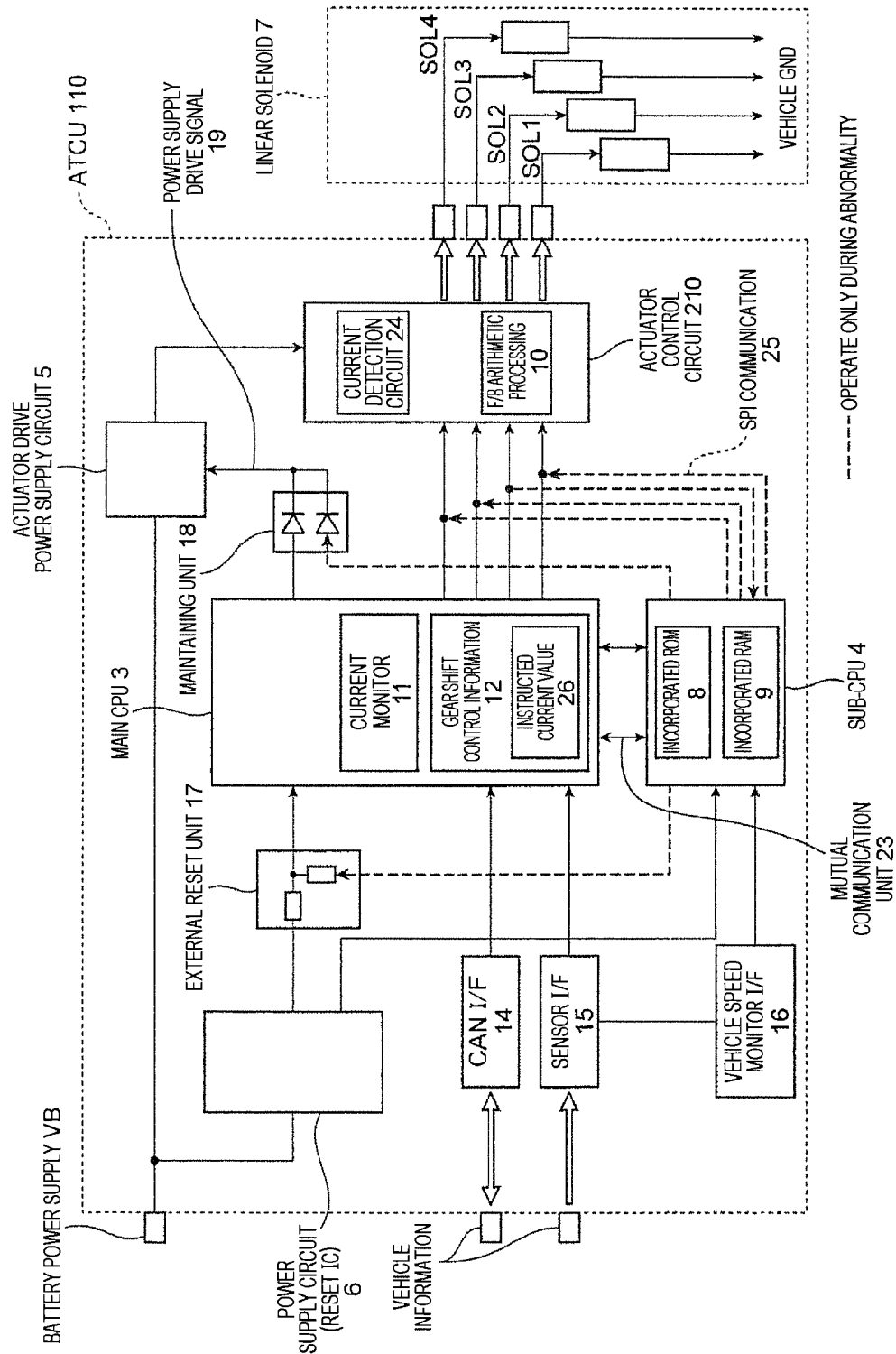
FIG. 8 is a configuration diagram of an electronic control device according to a second embodiment.

FIG. 8 is an exemplary configuration diagram illustrating an ATCU 110 according to a second embodiment. The description of the components denoted with the same reference numerals as in FIG. 4 and the parts with the same functions will be omitted. There will be described an exemplary electronic control device capable of performing the current feedback (F/B) arithmetic processing 10 inside an actuator control circuit 210 even when the main CPU 4 is abnormal according to the second embodiment.

As in the first embodiment, when being normal, the main CPU 3 transmits the patterned bit information such as current gear position information illustrated in FIG. 2, and the instructed current value 26 for each solenoid, as the gear shift control information 12, to the sub-CPU 4 via the mutual communication unit 23, and the sub-CPU 4 stores them in the incorporated RAM 9. The actuator control circuit 210 includes the current detection circuit 24 therein, and performs the F/B arithmetic processing 10 therein, thereby creating a linear solenoid drive signal for controlling the hydraulic pressure required for gear shift control without the arithmetic processing by the main CPU 3. Thereby, the DUTY information according to the first embodiment is not required in the second embodiment, and the sub-CPU 4 can directly instruct the current value to each solenoid for the actuator control circuit 210 by use of the instructed current value 26 received from the main CPU 3. Therefore, the sub-CPU 4 has only to transmit the instructed current value 26 transmitted and stored in the incorporated RAM 9 when the main CPU 3 is normal to the actuator control circuit 210 via the SPI communication 25 in order to perform the control of maintaining a current gear position as the first soft landing operation.

Figure 9:
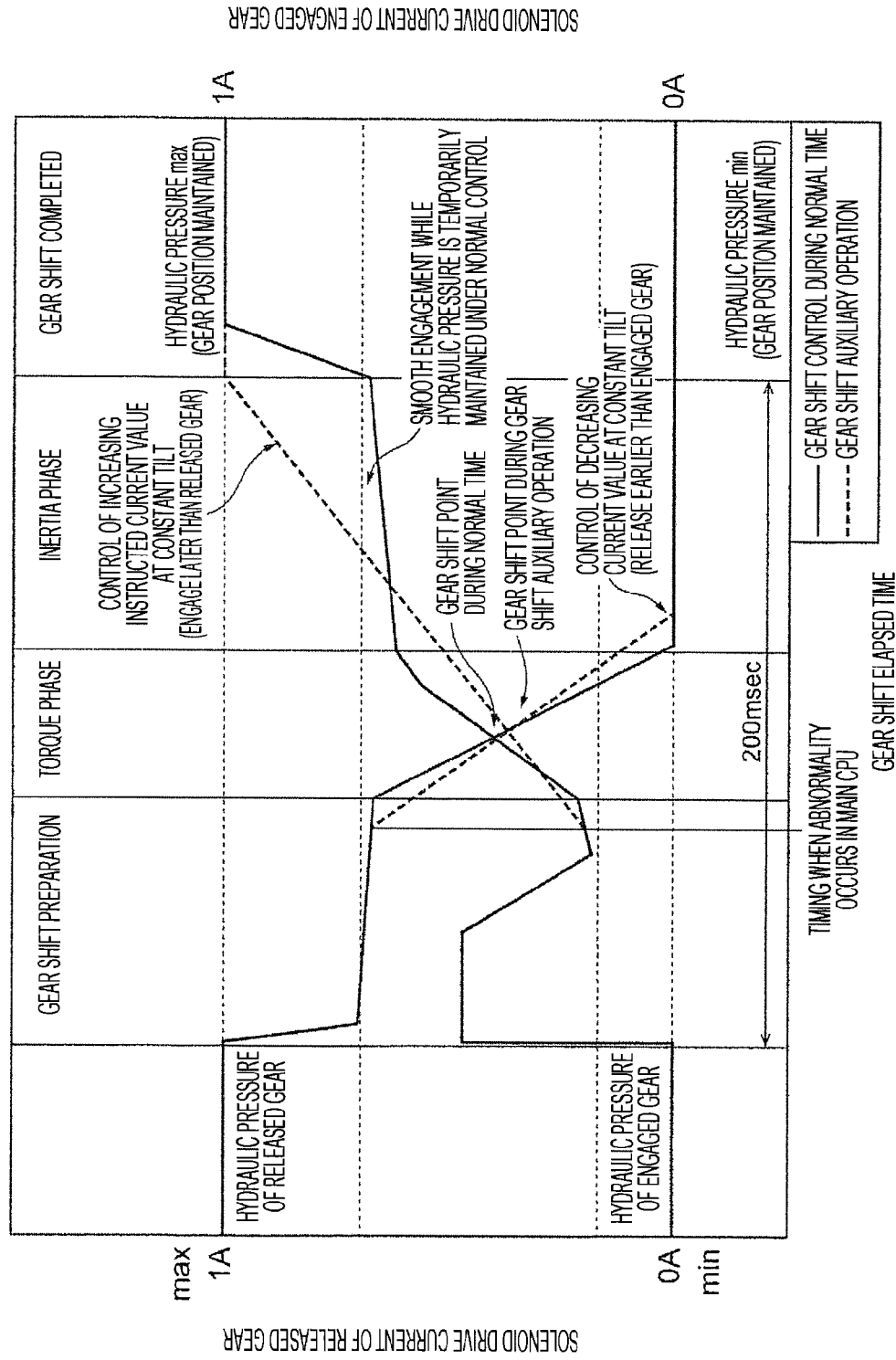
FIG. 9 illustrates an exemplary graph of solenoid current control corresponding to the graph of hydraulic control in FIG. 3.

The gear shift auxiliary operation as the second soft landing operation will be described. FIG. 9 illustrates a relationship between current value and hydraulic pressure on gearshift from first to second by way of example, in which the current values are described in the graph of hydraulic control on gear shift illustrated in FIG. 3. The instructed current value of SOL1 for controlling the hydraulic pressure of the released gear may be controlled from 1 A to 0 A and the instructed current value of SOL3 for controlling the hydraulic pressure of the engaged gear may be controlled from 0 A to 1 A, for example, on gear shift from first to second. According to the present embodiment, the instructed current value is changed at a constant speed, and the control of decreasing the instructed current value of SOL1 at a constant tilt and the control of increasing the instructed current value of SOL3 at a constant tilt are performed, for example. At this time, the hydraulic pressure of the released gear needs to be min before the hydraulic pressure of the engaged gear reaches max in order to prevent double mesh of the gears, and thus the control of providing the instructed current value with the amount of change as in FIG. 10 is previously stored in the ROM incorporated in the sub-CPU. The time for normal gear shift is different per transmission, and thus the amount of change needs to be previously adjusted, but if the total gearshift time is assumed at 200 msec, it takes 100 msec at the change of −10 mA/1 msec in order to change the current value for controlling the hydraulic pressure of the released gear from 1A to 0A, and it takes 200 msec at the change of 5 mA/1 msec in order to change the current value for controlling the hydraulic pressure of the engaged gear from 0 A to 1 A. Therefore, the brake 1 of the gear connected before the gear position is changed is released at a constant release speed, and the brake 2 of the gear connected after the gear position is changed is engaged at a constant engagement speed half as low as the release speed of the brake 1.

In this way, the soft landing operation for auxiliary gear shift is enabled even when an abnormality occurs in the main CPU during gear shift.

The soft landing operation of maintaining a gear position after gear shift is performed on the basis of FIG. 7 as in the first embodiment until the vehicle temporarily stops after the gear shift auxiliary operation is completed.

According to the second embodiment of the ATCU 110 using the above configuration and the control operation, the soft landing operation can be simply operated even by use of the sub-CPU 4 lower in arithmetic capability than the main CPU 3 as in the first embodiment.

REFERENCE SIGNS LIST

100, 110 electronic control device (ATCU)
200, 210 actuator control circuit
3 main CPU
4 sub-CPU
5 actuator drive power supply
6 power supply circuit (reset IC)
7 linear solenoid
8 sub-CPU incorporated ROM
9 sub-CPU incorporated RAM
10 F/B arithmetic processing
11 current monitor
12 gear shift control information
13 DUTY information
14 CAN I/F
15 sensor I/F
16 vehicle speed monitor I/F
17 external reset unit
18 maintaining unit
19 power supply drive signal
21 output switching I/F
22 solenoid drive signal
23 mutual communication unit
24 current detection circuit
25 SPI communication
26 instructed current value

The invention claimed is:

1. An electronic control device for vehicular automatic transmission having a fail-safe mechanism that fixes a preset gear position due to abnormal stop of electronic control, the electronic control device comprising:
   a main CPU that performs gear shift control of the vehicular automatic transmission; and
   a sub-CPU that detects an abnormality in the main CPU, wherein the sub-CPU obtains information on whether a control state of the vehicular automatic transmission is while a gear position is being maintained or while a gear position is being changed from the main CPU,
   when detecting an abnormality in the main CPU while the vehicle is traveling, performs alternative control of stopping gear shift control by the main CPU, causing the vehicular automatic transmission to perform a gear position maintaining operation of continuing to maintain a gear position while the gear position is being maintained, and causing the vehicular automatic transmission to perform a gear shift auxiliary operation of continuing the gear position shift operation and maintaining a shifted gear position while the gear position is being changed instead of the main CPU, and
   terminates the alternative control when the vehicle stops traveling, and abnormally stops electronic control of the vehicular automatic transmission.

2. The electronic control device for vehicular automatic transmission according to claim 1,
   wherein the vehicular automatic transmission has a clutch or brake to be released or engaged under hydraulic control and a solenoid that controls the hydraulic pressure, and
   the sub-CPU performs the control of transmitting a drive signal including the amount of change to a solenoid that controls the hydraulic pressure of the clutch or brake to be released and a solenoid that controls the hydraulic pressure of the clutch or brake to be engaged and causing them to perform the gear shift auxiliary operation as the alternative control while the gear position is being changed.

3. The electronic control device for vehicular automatic transmission according to claim 2,
   wherein the sub-CPU performs, as the gear shift auxiliary operation, an operation of releasing the clutch or brake of the gear connected before the gear position of the vehicular automatic transmission is changed at a constant release speed and engaging the clutch or brake of the gear connected after the gear position of the vehicular automatic transmission is changed at a constant engagement speed lower than the release speed.

4. The electronic control device for vehicular automatic transmission according to claim 3,
wherein the main CPU transmits DUTY information on a PWM signal for controlling the solenoid to the sub-CPU, and the sub-CPU performs the alternative control on the basis of the DUTY information.

5. The electronic control device for vehicular automatic transmission according to claim 4,
wherein the sub-CPU controls the solenoid on the basis of drive DUTY in the DUTY information transmitted from the normal main CPU before an abnormality is detected in the main CPU while the gear position is being maintained, and controls the solenoid by use of drive DUTY and target DUTY in the DUTY information transmitted from the main CPU before an abnormality is detected in the main CPU while the gear position is being changed in the alternative control.

6. The electronic control device for vehicular automatic transmission according to claim 3,
wherein the main CPU transmits an instructed current value for controlling the solenoid of the vehicular automatic transmission to the sub-CPU, and
the sub-CPU performs the alternative control on the basis of the instructed current value.

7. The electronic control device for vehicular automatic transmission according to claim 6,
wherein the sub-CPU performs the control of outputting the instructed current value transmitted from the normal main CPU before an abnormality is detected in the main CPU to the solenoid while the gear position is being maintained, and outputting the instructed current value transmitted from the normal main CPU before an abnormality is detected in the main CPU to the solenoid while changing the instructed current value at a constant speed while the gear position is being changed in the alternative control.

8. The electronic control device for vehicular automatic transmission according to claim 1,
wherein the sub-CPU resets the main CPU when detecting an abnormality in the main CPU,
terminates the alternative control and causes the main CPU to restart gear shift control when the main CPU normally recovers from the reset, and
terminates the alternative control when the vehicle stops traveling, and abnormally stops electronic control of the vehicular automatic transmission when the main CPU does not normally recover from the reset.

9. An electronic control device for vehicular automatic transmission having a fail-safe mechanism that fixes a preset gear position due to abnormal stop of electronic control, the electronic control device comprising:
a main CPU for that performs gear shift control of the vehicular automatic transmission; and
a sub-CPU that detects an abnormality in the main CPU,
wherein the sub-CPU obtains information on whether a control state of the vehicular automatic transmission is while a gear position is being maintained or while a gear position is being changed from the main CPU,
when detecting an abnormality in the main CPU while the vehicle is traveling, causes the main CPU to stop gear shift control, and causes the vehicular automatic transmission to perform a gear position maintaining operation of continuing to maintain a gear position while the gear position is being maintained, and
causes the vehicular automatic transmission to continue the gear position shift operation and to maintain a shifted gear position while the gear position is being changed.

* * * * *